Patented Nov. 12, 1929

1,735,158

UNITED STATES PATENT OFFICE

STEWART J. CARROLL, OF ROCHESTER, NEW YORK, ASSIGNOR TO EASTMAN KODAK COMPANY, OF ROCHESTER, NEW YORK, A CORPORATION OF NEW YORK

CELLULOSE-ETHER COMPOSITION

No Drawing. Application filed October 7, 1925. Serial No. 61,142.

This invention relates to a composition of matter in which cellulose ether is combined or mixed with other substances, so that the resulting product can be advantageously used in the plastic and analogous arts, such for instance as sheet or film manufacture and varnish manufacture.

One object of the invention is to provide a composition which may be made into permanently transparent, strong and flexible sheets of films of desired thinness, which are substantially waterproof, are unaffected by ordinary photographic fluids, and possess the desired properties of a support for light-sensitive photographic coatings. Another object of my invention is to produce a composition capable of easy manipulation in the plastic and film-making, or varnish making or allied arts; but will not injure or be injured by the substances with which it is associated during manufacture, storage or use. Still another object of my invention is to provide a film having the hereinabove described properties. Other objects will hereinafter appear.

I have found that a composition having the desirable qualities hereinabove enumerated can be obtained by mixing or compounding cellulose ether, say for example an alkyl ether of the type described in U. S. Patent No. 1,188,376, June 20, 1916, Leon Lilienfeld, with ethylene glycol. This mixing to a colloidized state is preferably performed with the aid of a common solvent. While the details of one way of carrying out my invention will be given by way of example, it will be understood that my invention is not restricted thereto, except as indicated in the appended claim.

Ethylene glycol has the inherent characteristic of being a substantial non-solvent of cellulose ether, especially water-insoluble ethyl cellulose. By non-solvent I mean that the addition of enough of ethylene glycol to a solution of cellulose ether will precipitate said ether from the solution.

In carrying out one embodiment of my invention, 100 parts of water-insoluble ethyl cellulose are dissolved along with from 10 to 50 parts of ethylene glycol (say 20 parts) in from 300 to 500 parts of a volatile common solvent. The latter may usefully comprise a mixture of methyl acetate and methyl alcohol, the weight of methyl acetate being approximately nine times the weight of the alcohol. This composition is suitable for spreading upon a film-forming surface in a coating, from which the volatile solvent evaporates sufficiently to leave a transparent flexible sheet, which is stripped off and otherwise treated in the way well known in this art. The parts are by weight. The transparency and flexibility of the sheet show that the cellulose ether and the ethylene glycol remain in the colloidized state without precipitating each other.

Where a more readily flowable composition is desired, the amount of volatile solvent may be increased until the desired results are obtained. Benzol and ethyl or methyl alcohol may be added in thinning it out. Of course, other equivalent volatile solvent mixtures may be substituted. Moreover, ingredients which impart characteristic properties to the film may likewise be added, such as triphenyl phosphate, tricresyl phosphate, camphor, monochlornaphthalene, etc. The proportions of these substances, or mixtures of them, should not be sufficient to cause precipitation of the ether, or to cause white films or varnish coatings to be produced. The ingredients are of the commercial type and sufficiently purified for the ends in view. Where the dope is to be made into sheets of films for photographic purposes, the substances are chosen or purified to have the proper relative freedom from color.

Having thus described my invention, what

I claim as new and desire to secure by Letters Patent is:

As an article of manufacture, a film comprising water-insoluble alkyl cellulose and ethylene glycol, said film being formed from a composition containing between 10 and 50 parts by weight of ethylene glycol for each 100 parts of alkyl cellulose, the proportions of the ingredient being such that the film is flexible and transparent.

Signed at Rochester, New York this 20th day of September, 1925.

STEWART J. CARROLL.